(12) United States Patent
Kao (10) Patent No.: US 10,875,173 B1
(45) Date of Patent: Dec. 29, 2020

(54) TOOL HOLDING RACK AND SUSPENDING BOARD FOR HANGING THE SAME

(71) Applicant: Jui Chien Kao, Taichung (TW)

(72) Inventor: Jui Chien Kao, Taichung (TW)

(*) Notice: Subject to any disclaimer, the term of this patent is extended or adjusted under 35 U.S.C. 154(b) by 0 days.

(21) Appl. No.: 16/661,094

(22) Filed: Oct. 23, 2019

(51) Int. Cl.
| | | |
|---|---|---|
| *B25H 3/04* | (2006.01) | |
| *F16M 13/02* | (2006.01) | |
| *B25H 3/00* | (2006.01) | |

(52) U.S. Cl.
CPC ............... *B25H 3/04* (2013.01); *B25H 3/003* (2013.01); *F16M 13/022* (2013.01)

(58) Field of Classification Search
CPC ......... B25H 3/04; B25H 3/003; F16M 13/022
See application file for complete search history.

(56) References Cited

U.S. PATENT DOCUMENTS

| | | | | | |
|---|---|---|---|---|---|
| 2,965,235 | A * | 12/1960 | Daline | ...................... | B25H 3/04 211/1 |
| 3,154,281 | A * | 10/1964 | Frank | ...................... | H02G 3/32 248/201 |
| 3,809,799 | A * | 5/1974 | Taylor | ...................... | H02G 3/045 174/68.3 |
| 4,391,376 | A * | 7/1983 | Finnegan | ............. | A63C 11/028 211/70.5 |
| 4,405,108 | A * | 9/1983 | Muirhead | ............. | A47F 5/0823 211/70.6 |
| 4,441,619 | A * | 4/1984 | Gibitz | ...................... | B25H 3/04 211/59.1 |
| 4,781,608 | A * | 11/1988 | Hillmann | ................. | B60M 1/34 439/212 |
| 4,852,747 | A * | 8/1989 | Breveglieri | ........... | A47L 13/512 211/70.6 |
| 5,109,992 | A * | 5/1992 | Miller | ................... | A47F 5/0823 211/59.1 |
| 5,165,629 | A * | 11/1992 | Breveglieri | ........... | A47F 5/0884 211/60.1 |
| 6,202,865 | B1 * | 3/2001 | Kuo | ...................... | A47F 5/0815 211/70.6 |
| 7,198,158 | B2 * | 4/2007 | Kao | ........................ | A47F 5/083 211/70.6 |
| 7,424,958 | B1 * | 9/2008 | Eley | ........................ | B25H 3/04 211/70.6 |
| 7,523,832 | B2 * | 4/2009 | Kao | ...................... | A47F 5/0807 206/376 |
| 7,861,871 | B2 * | 1/2011 | Kao | ........................ | B25H 3/04 206/349 |

(Continued)

FOREIGN PATENT DOCUMENTS

| | | | | |
|---|---|---|---|---|
| DE | 3833294 C1 * | 8/1989 | ............... | B25H 3/04 |
| DE | 29520265 U1 * | 2/1996 | ................. | B60P 7/08 |

(Continued)

*Primary Examiner* — Stanton L Krycinski
(74) *Attorney, Agent, or Firm* — Birch, Stewart, Kolasch & Birch, LLP (57) ABSTRACT

A tool holding rack has a back board and a pair of hanging hooks. The pair of hanging hooks is attached to the back board. Each hanging hook has a hook body, at least one through hole, and a track channel. The at least one through hole is defined through the hook body. The track channel is defined in the hook body, wherein the back board extends through the track channels in the pair of hanging hooks.

7 Claims, 14 Drawing Sheets

(56) References Cited

U.S. PATENT DOCUMENTS

| | | | | |
|---|---|---|---|---|
| 7,882,965 B1* | 2/2011 | Kao | ........................ | B25H 3/04 |
| | | | | 211/106.01 |
| 7,931,159 B2* | 4/2011 | Kao | ........................ | B25H 3/04 |
| | | | | 211/70.6 |
| 7,950,534 B2* | 5/2011 | Kao | ........................ | B25H 3/04 |
| | | | | 211/70.6 |
| 9,757,853 B2* | 9/2017 | Su | ............................ | B25H 3/04 |
| 2011/0011813 A1* | 1/2011 | Kao | ........................ | B25H 3/04 |
| | | | | 211/70.6 |
| 2011/0187248 A1* | 8/2011 | Kao | ....................... | A47B 81/00 |
| | | | | 312/280 |
| 2011/0192810 A1* | 8/2011 | Kao | ....................... | B25H 3/028 |
| | | | | 211/70.6 |

FOREIGN PATENT DOCUMENTS

| | | | | |
|---|---|---|---|---|
| DE | 102009055391 A1 * | 6/2011 | ............... | B25H 3/04 |
| DE | 102010000604 A1 * | 9/2011 | ............... | B25H 3/028 |
| DE | 202013104514 U1 * | 10/2013 | ............... | B25H 3/04 |
| EP | 3000360 B1 * | 4/2017 | ........... | A47F 5/0815 |
| FR | 2229512 A1 * | 12/1974 | ......... | H05K 13/0053 |
| FR | 2357338 A1 * | 2/1978 | ........... | A47F 5/0815 |

* cited by examiner

TOOL HOLDING RACK AND SUSPENDING BOARD FOR HANGING THE SAME

BACKGROUND OF THE INVENTION

1. Field of the Invention

The present invention relates to a tool holding rack, and more particularly to a tool holding rack that can support tools and can be hung on a suspending board easily.

2. Description of Related Art

Conventionally, to take and use specific tools, tools taken out from a tool cabinet are suspended on a suspending board that is mounted on the tool cabinet. After used, the tools are put into the tool cabinet for next use. The conventional suspending board comprises a board body having multiple holding holes defined through the board body. After the taken out from the tool cabinet, the tools are suspended on the holding holes in the board body to allow a user to take and use the tools conveniently.

However, the tools have to be hung on the holding holes individually and respectively, so this is time-consuming and inconvenient.

To overcome the shortcomings, the present invention tends to provide a tool holding rack to mitigate or obviate the aforementioned problems.

SUMMARY OF THE INVENTION

The main objective of the invention is to provide a tool holding rack that can be hung on a suspending board conveniently.

The tool holding rack has a back board and a pair of hanging hooks. The pair of hanging hooks is attached to the back board. Each hanging hook has a hook body, at least one through hole, and a track channel. The at least one through hole is defined through the hook body. The track channel is defined in the hook body, wherein the back board extends through the track channels in the pair of hanging hooks.

The suspending board has a board body, at least one pair of hanging hooks, and a tool holding rack. The board body has multiple holding holes defined in the board body. The at least one pair of hanging hooks is mounted on the board body, and the hanging hooks of each one of the at least one pair of hanging hooks are spaced from each other. Each hanging hook has a hook body, at least one through hole, a track channel, and at least one fastening member. The at least one through hole is defined through the hook body. The track channel is defined in the hook body. The at least one fastening member is mounted respectively through the at least one through hole and is connected respectively with at least one of the holding holes in the board body to hold the hanging hook securely on the board body. The tool holding rack has a back board extending through the track channels in the hanging hooks of one of the at least one pair of hanging hooks.

Other objects, advantages and novel features of the invention will become more apparent from the following detailed description when taken in conjunction with the accompanying drawings.

DETAILED DESCRIPTION OF PREFERRED EMBODIMENT

Figure 1:
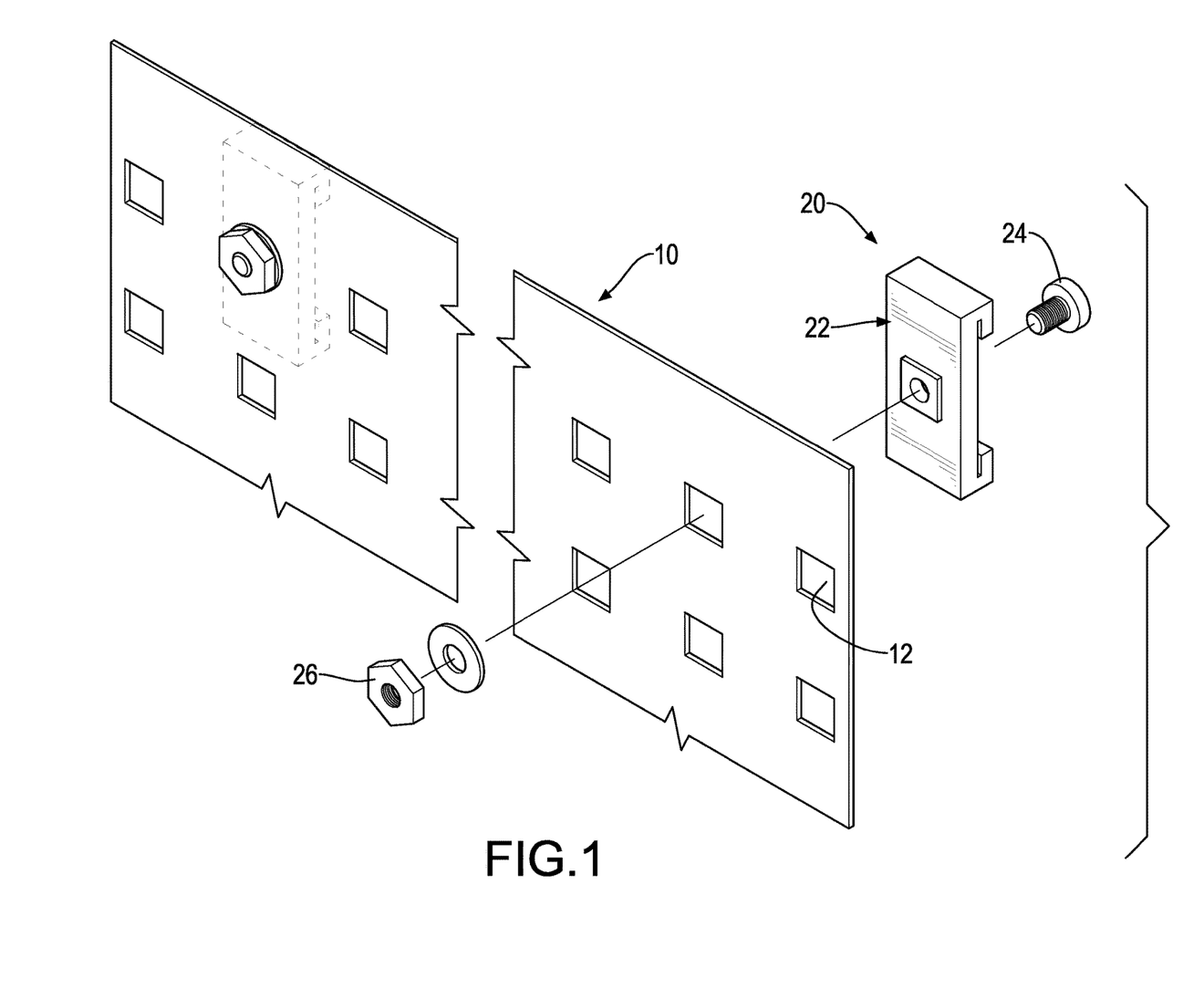
FIG. 1 is an exploded perspective view of a first embodiment of a suspending board in accordance with the present invention.
Figure 2:
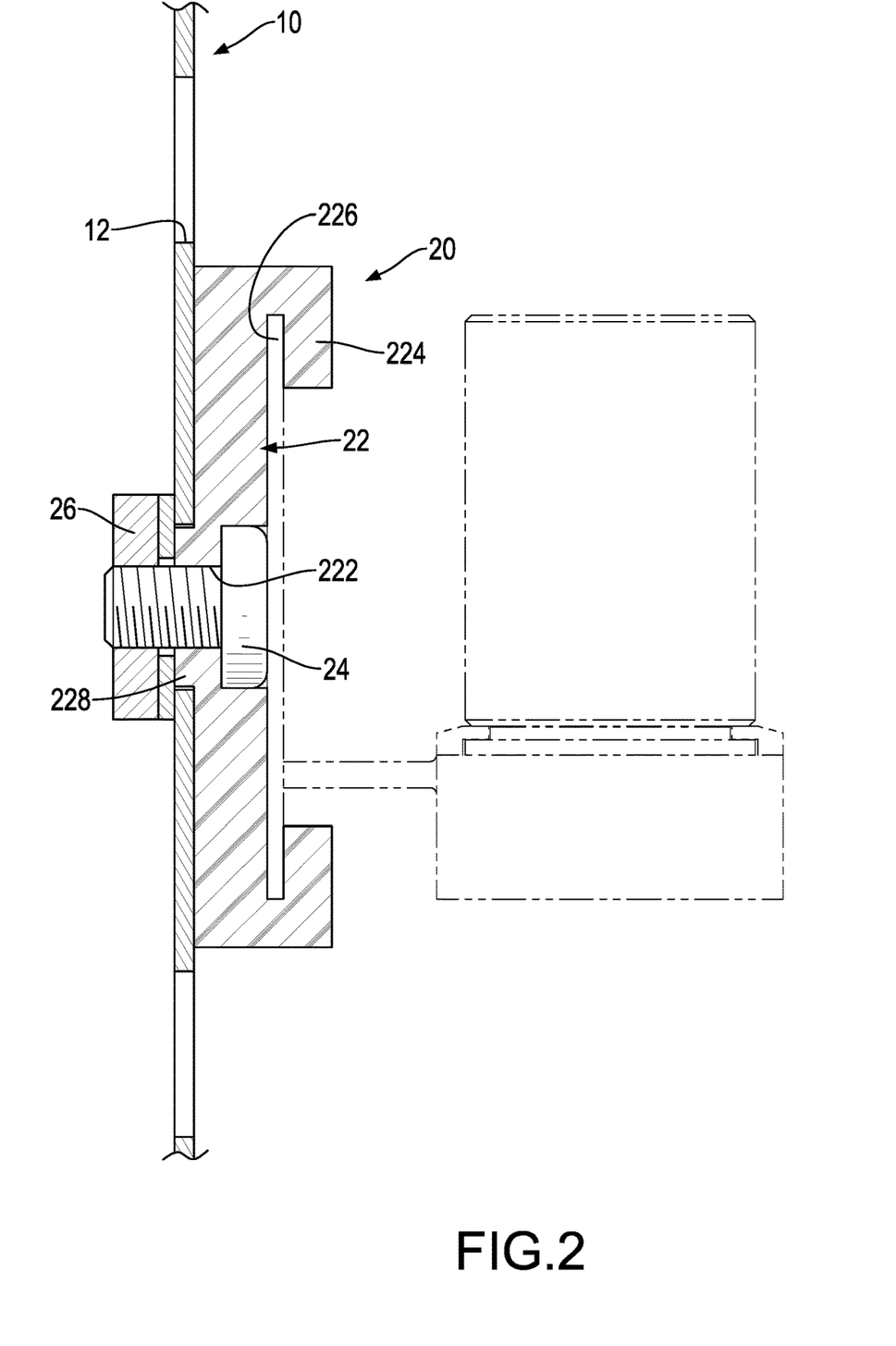
FIG. 2 is a cross sectional side view of the suspending board in FIG. 1.
Figure 3:
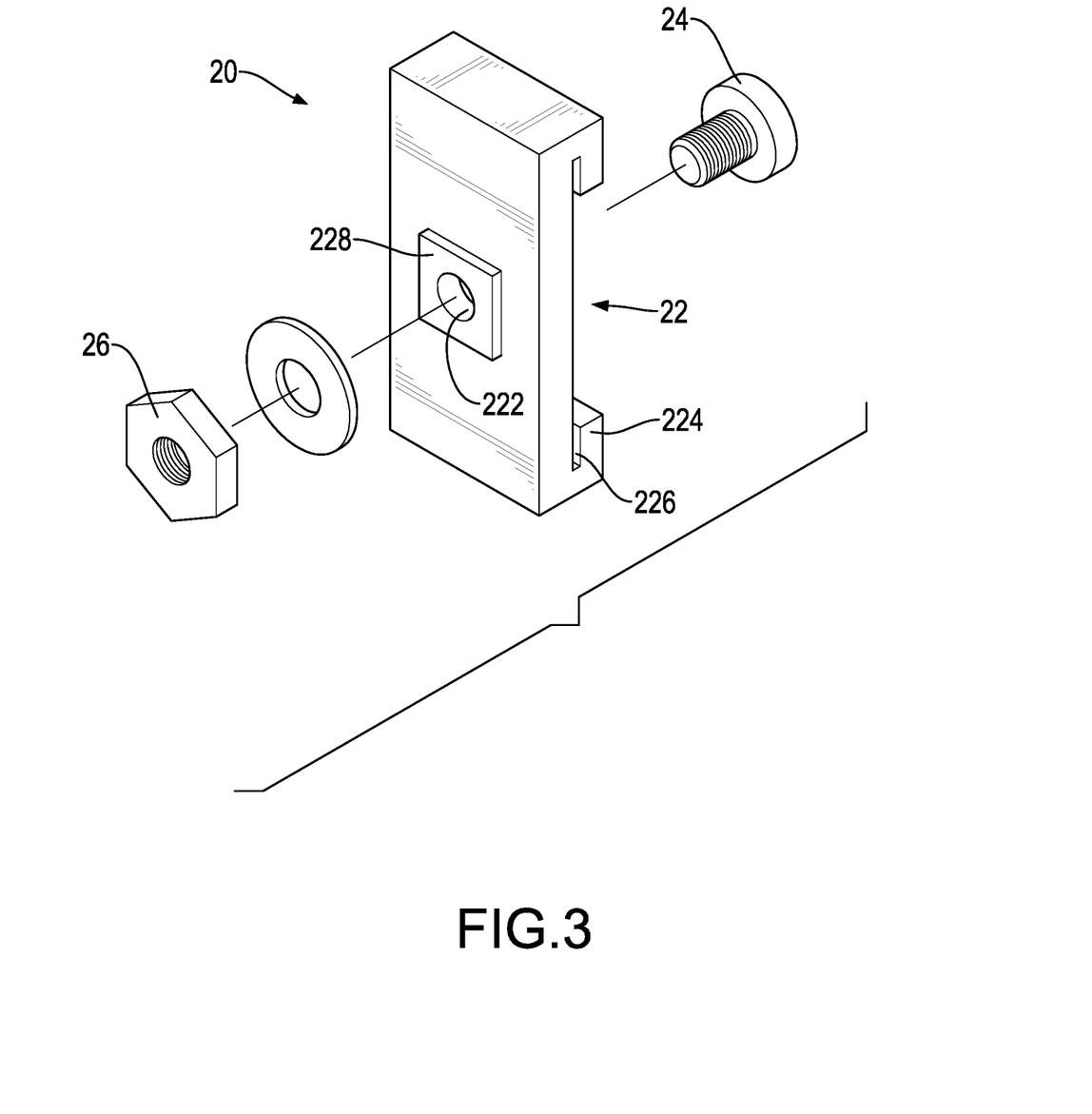
FIG. 3 is an enlarged exploded perspective view of the hanging hook in FIG. 1.
Figure 4:
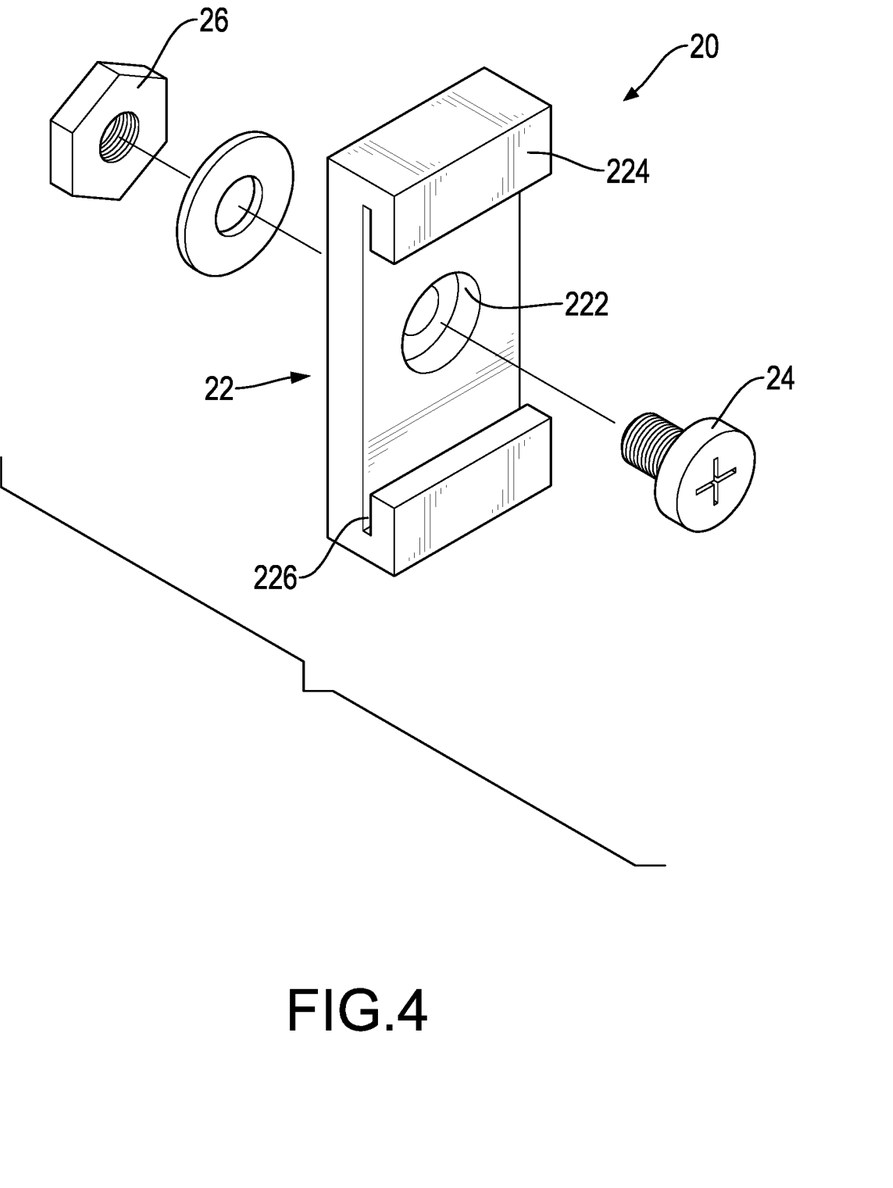
FIG. 4 is another enlarged exploded perspective view of the hanging hook in FIG. 1.
Figure 5:
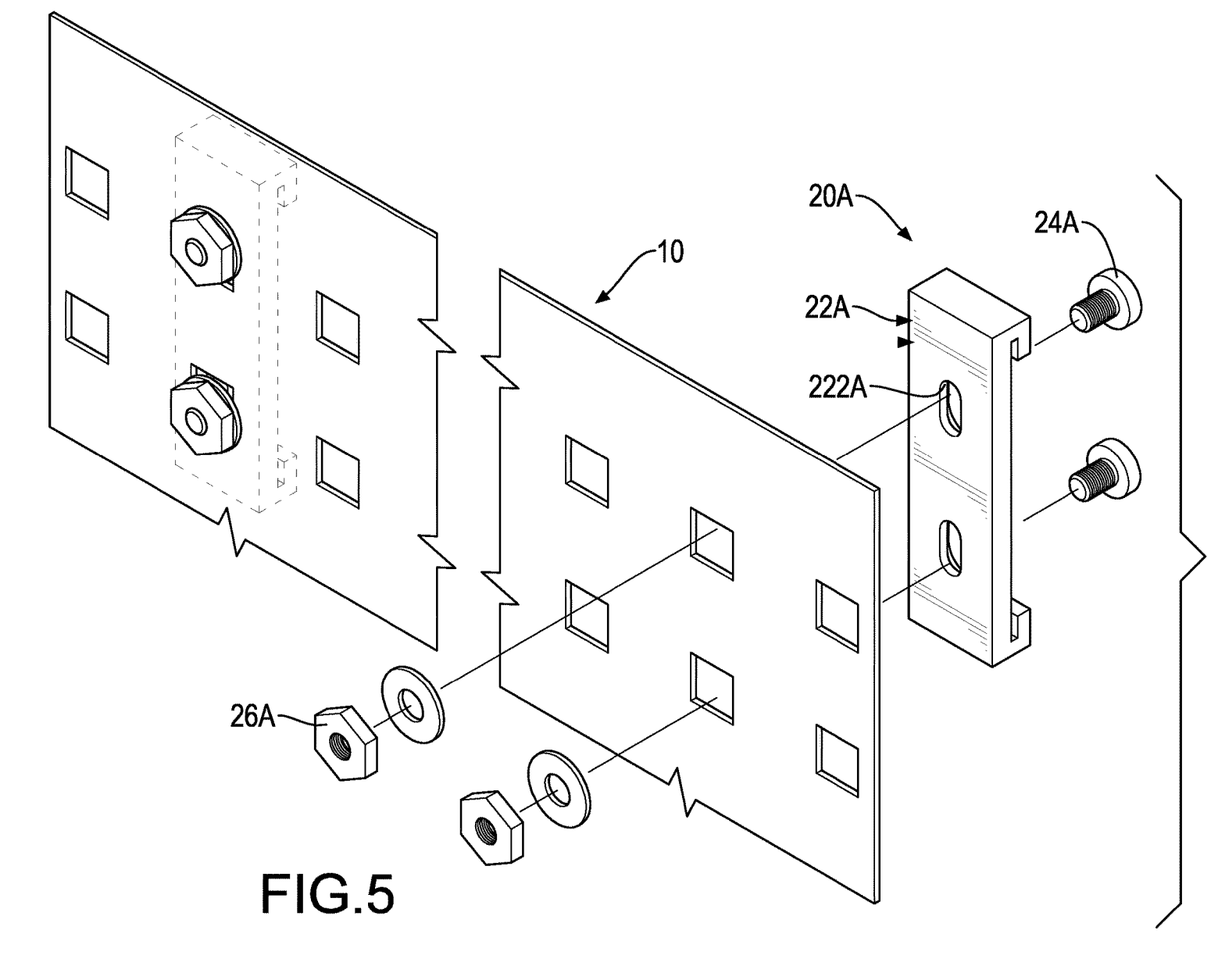
FIG. 5 is an exploded perspective view of a second embodiment of a suspending board in accordance with the present invention.
Figure 6:
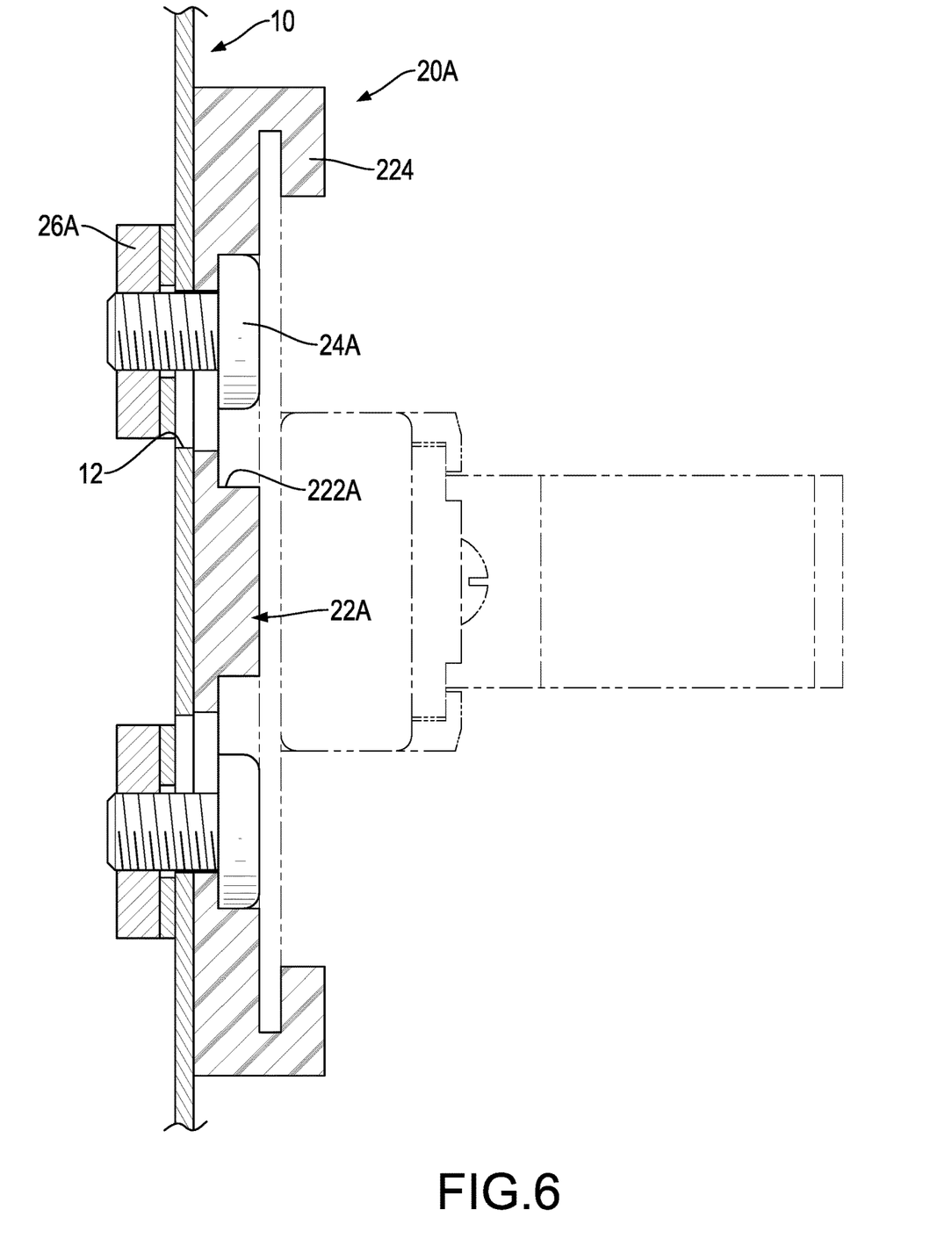
FIG. 6 is a cross sectional side view of the suspending board in FIG. 5.
Figure 7:
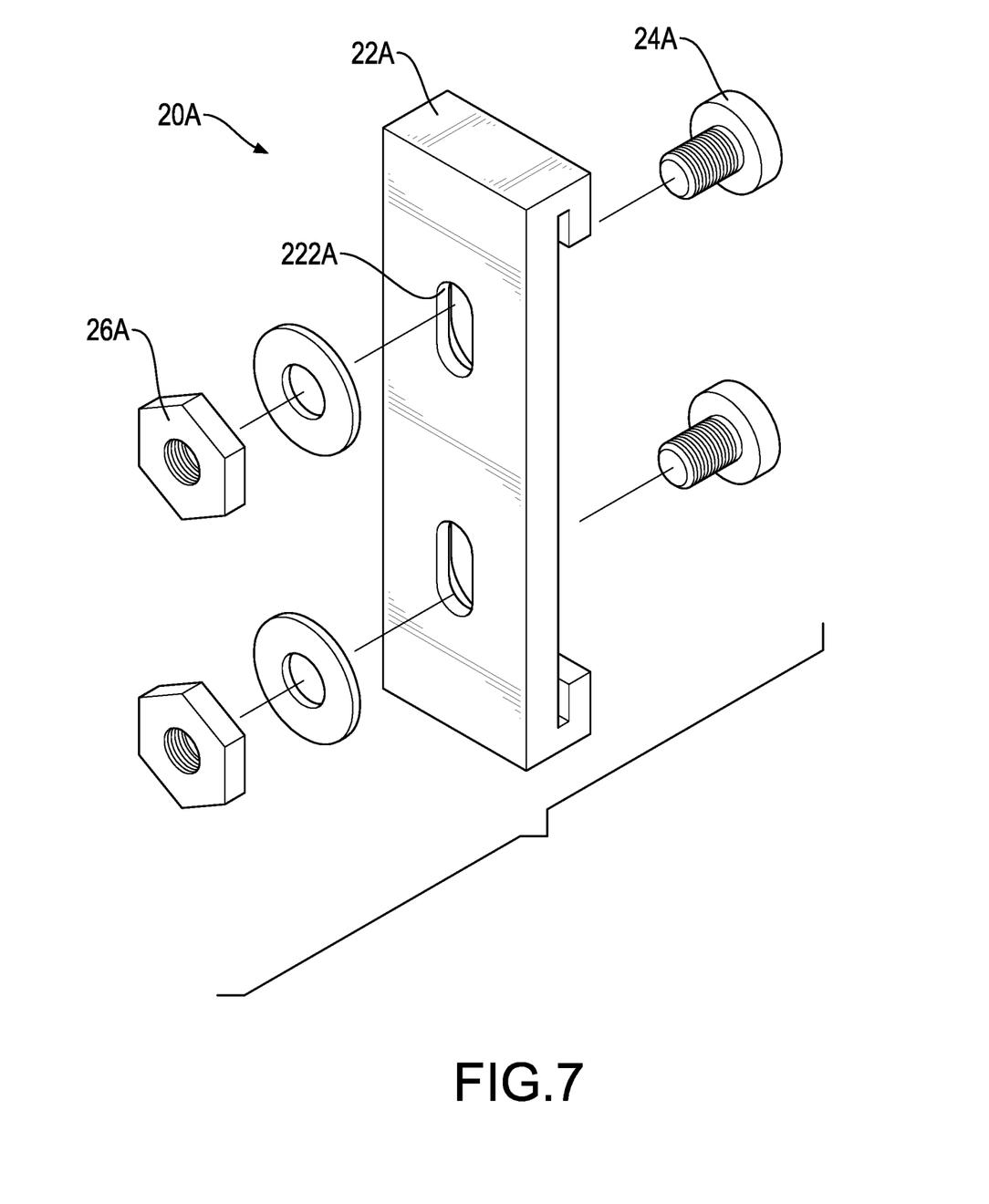
FIG. 7 is an enlarged exploded perspective view of the hanging hook in FIG. 5.
Figure 8:
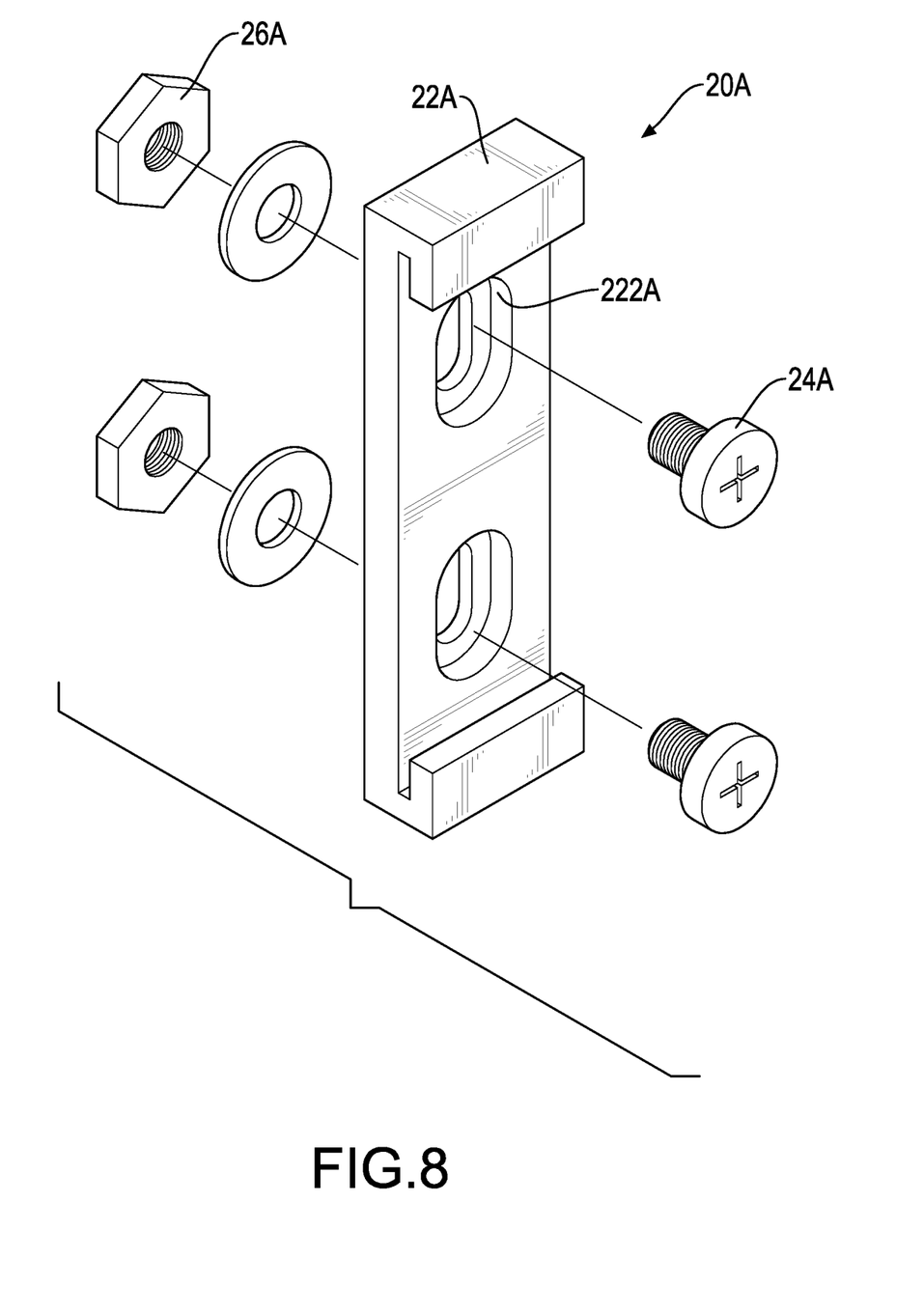
FIG. 8 is another enlarged exploded perspective view of the hanging hook in FIG. 5.
Figure 9:
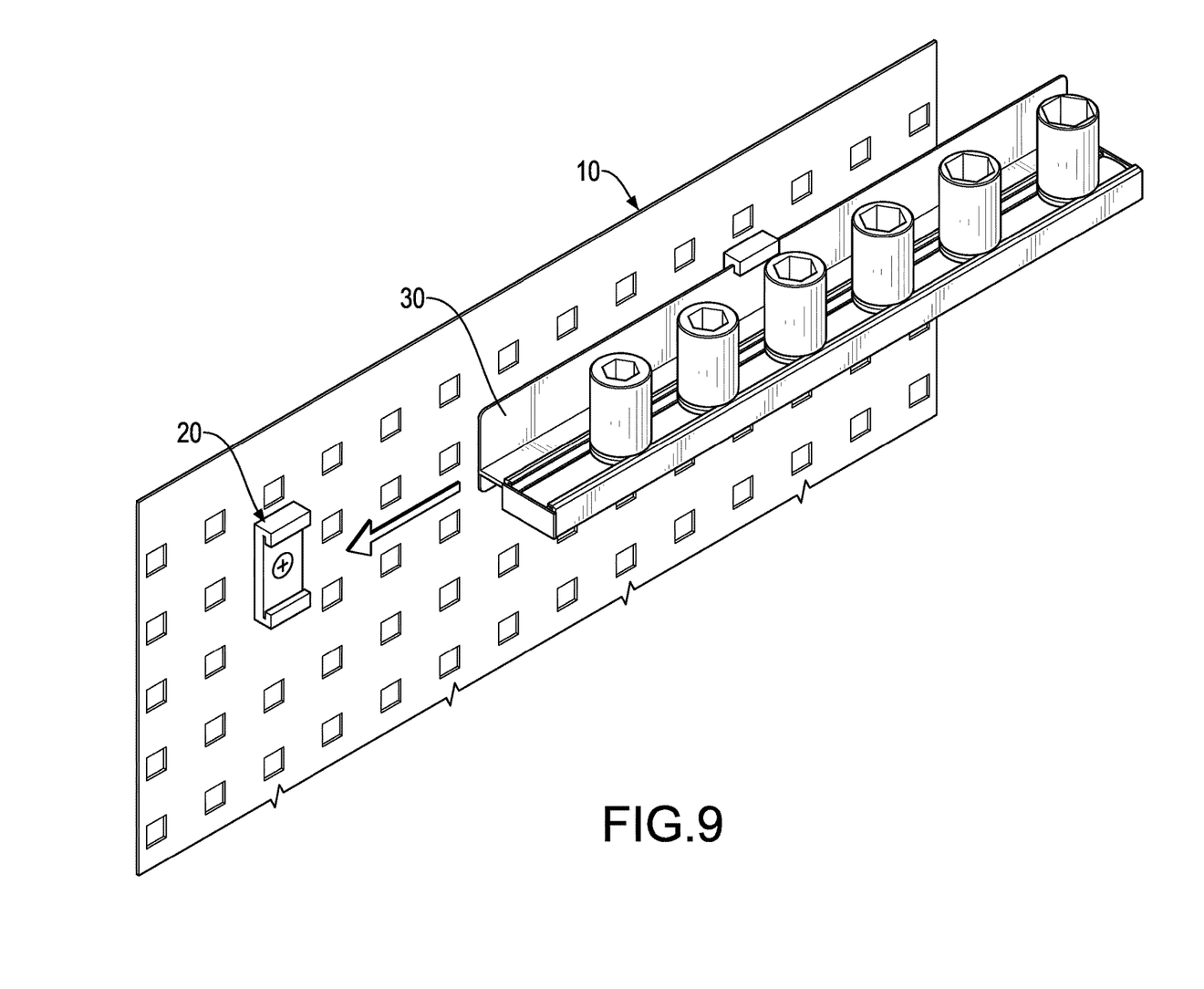
FIG. 9 is an operational perspective view of the suspending board in FIG. 1.
Figure 10:
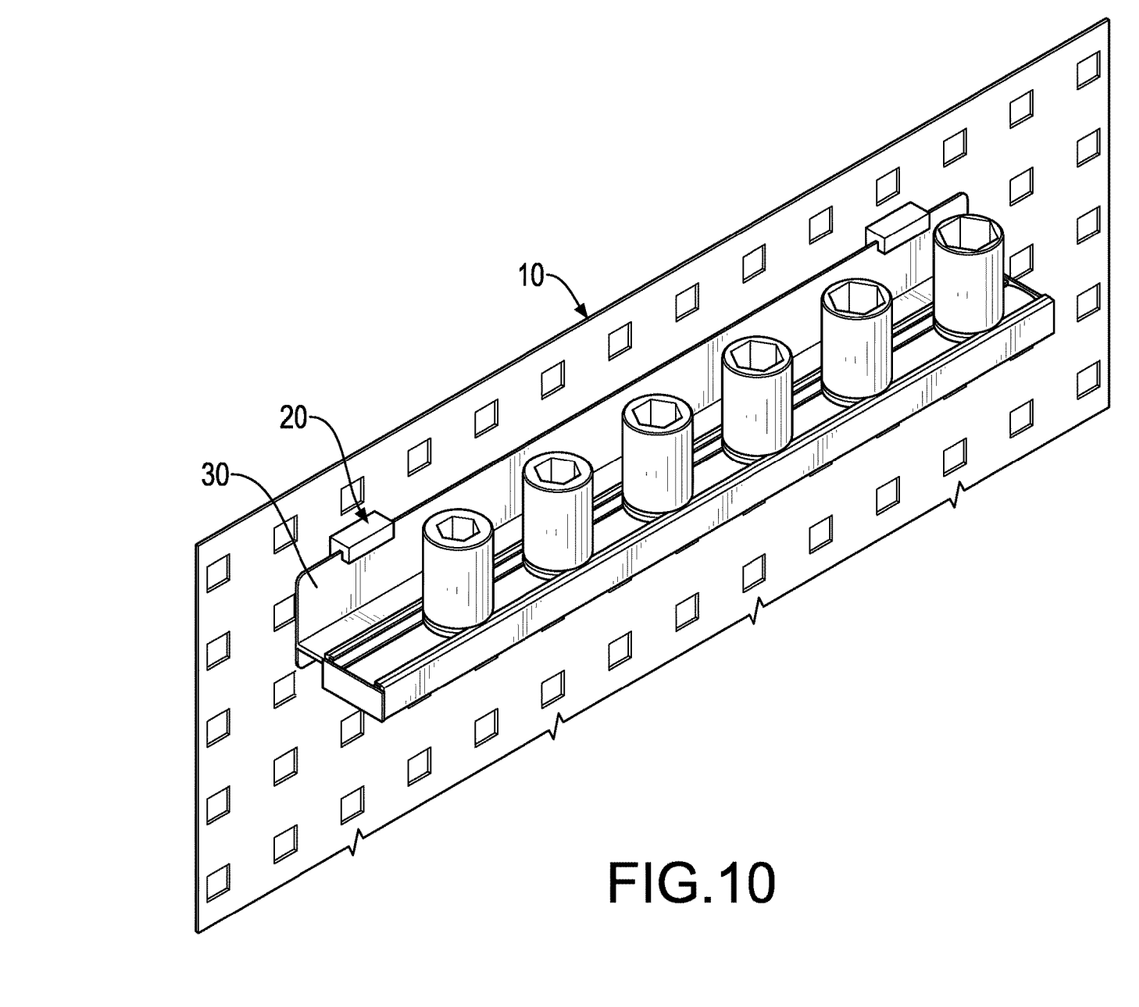
FIG. 10 is a perspective view of the suspending board in FIG. 1.
Figure 11:
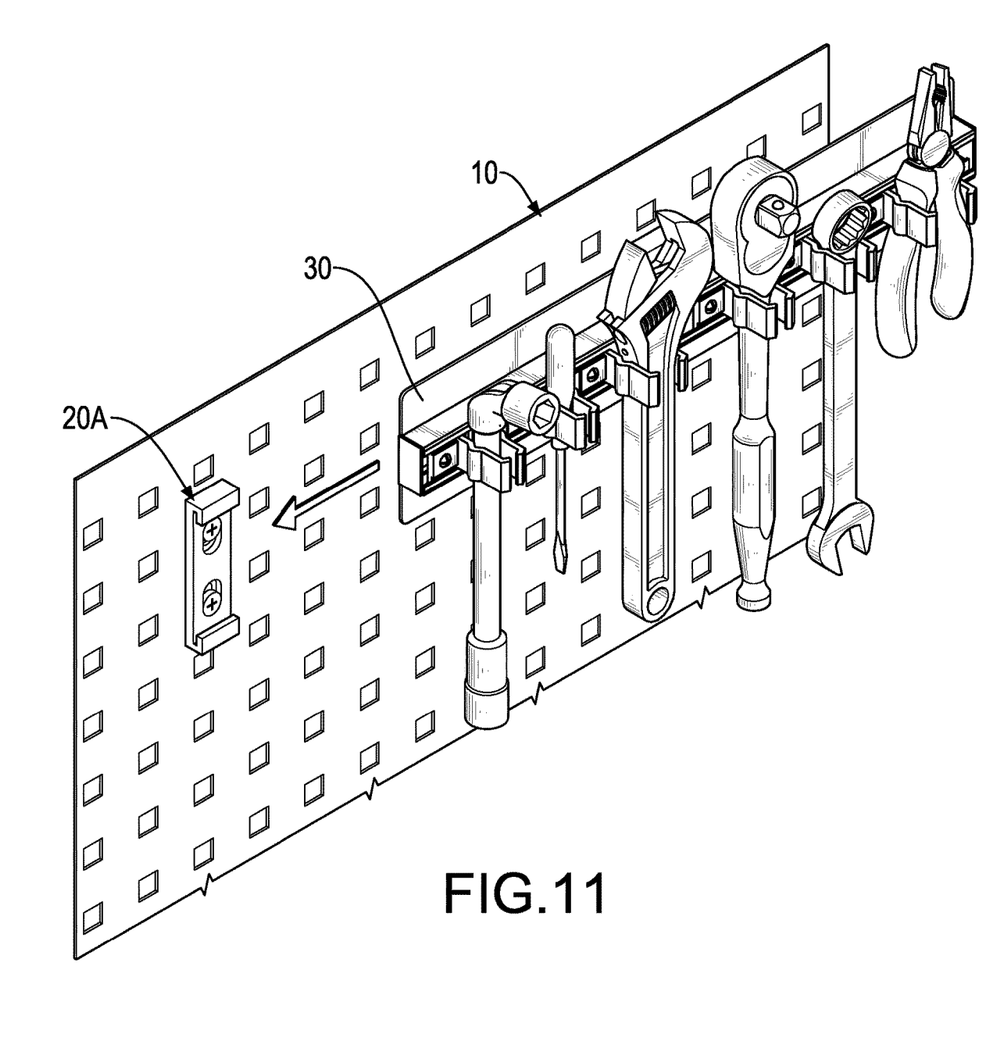
FIG. 11 is an operational perspective view of the suspending board in FIG. 5.
Figure 12:
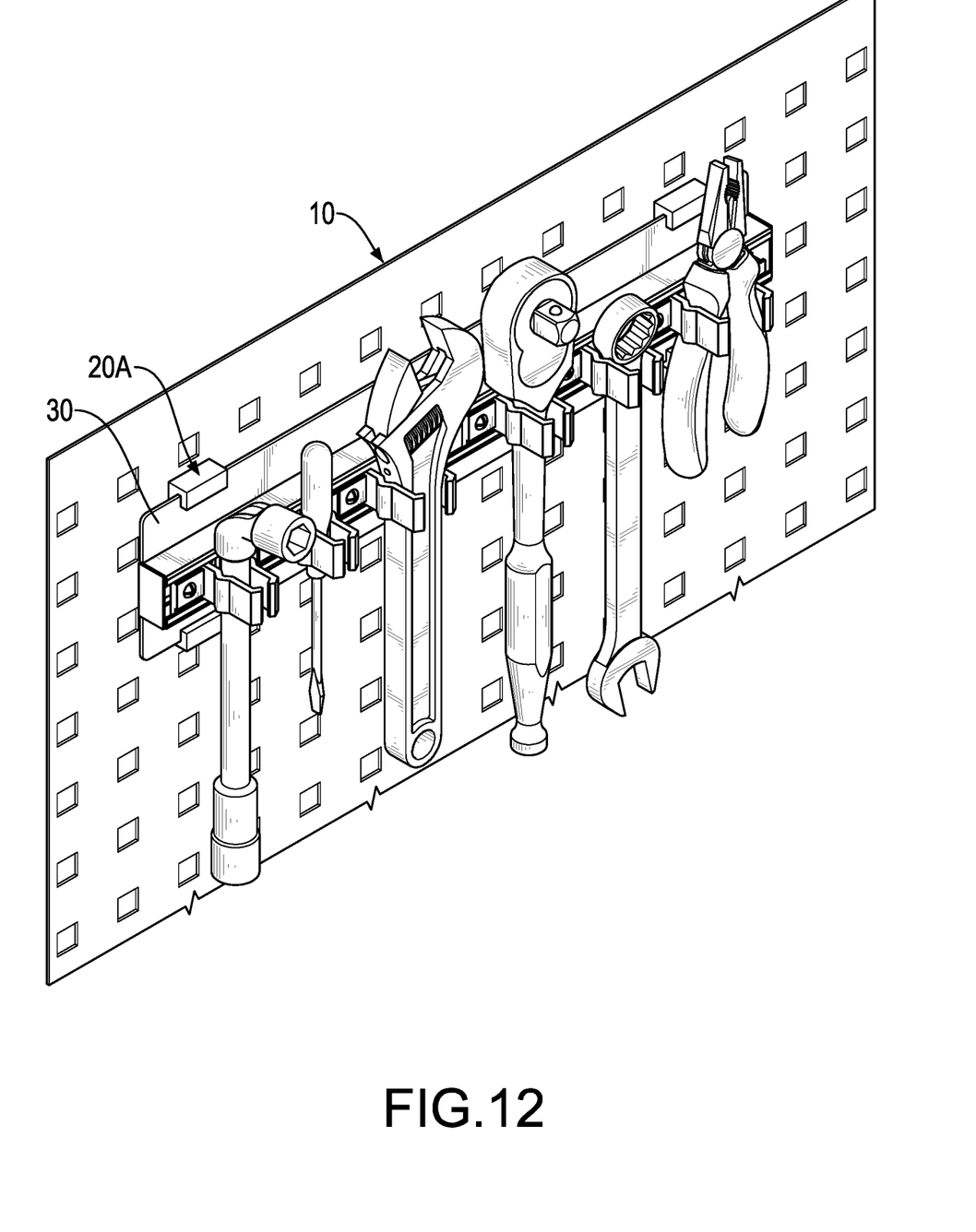
FIG. 12 is a perspective view of the suspending board in FIG. 5.

With reference to FIGS. 9 and 11, a tool holding rack in accordance with the present invention is applied to hold a group of tools, such as wrenches or sleeves thereon and comprises a main body and a back board 30 formed on a side of the main body. The structure of the main body may be conventional, so the detail of the main body is omitted.

With reference to FIGS. 1 to 4, the suspending board in accordance with the present invention comprises a board body 10 and at least one pair of hanging hooks 20. The board body 10 comprises multiple holding holes 12 defined in the board body 10. The holding holes 12 are arranged in multiple lines parallel with each other and are non-circular in shape, such as square or rectangular. The at least one pair of hanging hooks 20 is mounted on the board body 10, and the hanging hooks 20 of each pair are spaced from each other. Each hanging hook 20 comprises a hook body 22, at least one through hole 222, a track channel, and at least one fastening member. The hook body 22 may be elongated and has two hook protrusions 224. The hook protrusions 224 are formed on a side of the hook body 22 and are located respectively at two ends of the hook body 22. Each hook protrusion 224 on the hook body 22 has an engaging recess 226 defined in a side of the hook protrusion facing the other hook protrusion 224 on the hook body 22 to form the track channel by the engaging recesses 226 in the hook protrusions 224. The at least one through hole 222 is defined through the hook body 22. In the first embodiment, one single through hole 222 is defined through the hook body 22 and may be circular in shape. The hanging hook 20 may further have a fixing block 228 with a non-circular cross section formed on a side of the hook body 22 opposite the hook protrusions 224. The through hole 222 is defined through the fixing block 228. The cross sectional shape of the fixing block 228 corresponds to the shape of holding holes 12 in the board body 10. With the engagement of the fixing block 228 and one of the holding holes 12, the hanging hook 20 can be kept from rotating relative to the board body 10. The at least one fastening member is mounted respectively through the at least one through hole 222 in the hook body 22, and each fastening member comprises a bolt 24 and a nut 26. The bolt 24 is mounted through the corresponding through hole 222 and one of the holding holes 12 in the board body 10 and is screwed with the nut 26, such that the hanging hook 20 can be securely mounted on a desired position at the board body 10.

With reference to FIGS. 5 to 8, in a second embodiment, each hanging hook 20A comprises a hook body 22A and two fastening members. The hook body 22A is elongated and has two elongated through holes 222A. The two fastening members are mounted respectively through the two through holes 222A and two of the holding holes 12 in the board body 10. With the connection between the bolts 26A and the nuts 24A of the fastening members, the hanging hooks 20A are held securely on the board body 10 in position.

With reference to FIGS. 9 to 12, when in use, each pair of hanging hooks 20,20A is mounted horizontally on the board body 10 at a spaced interval to align the track channels in the hanging hooks 20,20A with each other. Consequently, the back board 30 of the tool holding rack with a group of tools mounted thereon is inserted into the aligned track channels in the hanging hooks 20,20A in sequence. Accordingly, the tool holding rack can he held on the hanging hooks 20,20A in position, and a user can take and use the tools on the tool holding rack easily and conveniently. After the tools are used, the back board 30 of the tool holding rack is pulled out from the track channels in the hanging hooks 20,20A, and the tool holding rack with the tools can be put into a cabinet for storage.

Figure 13:
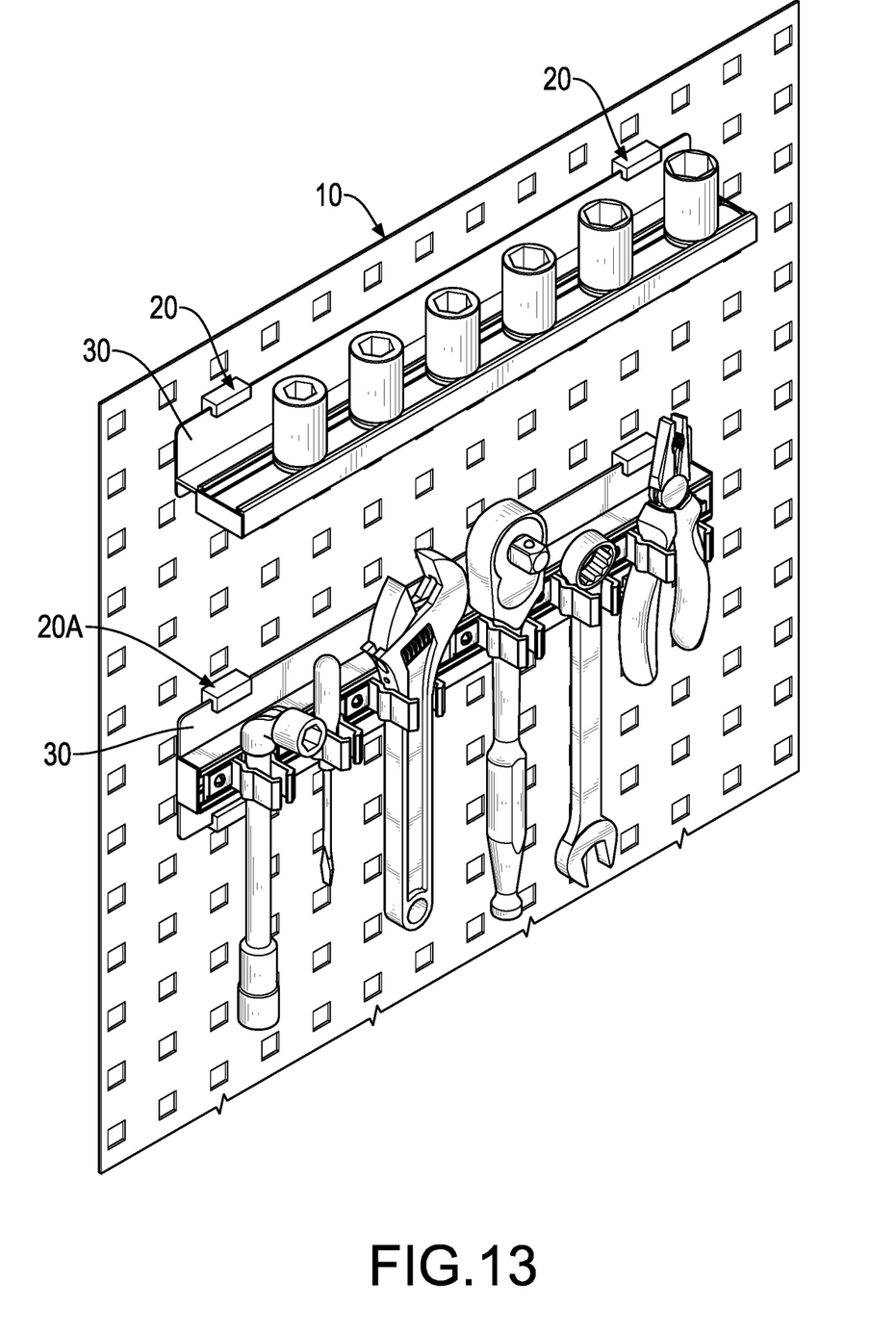
FIG. 13 is an operational perspective view of the suspending board in FIGS. 1 and 5.
Figure 14:
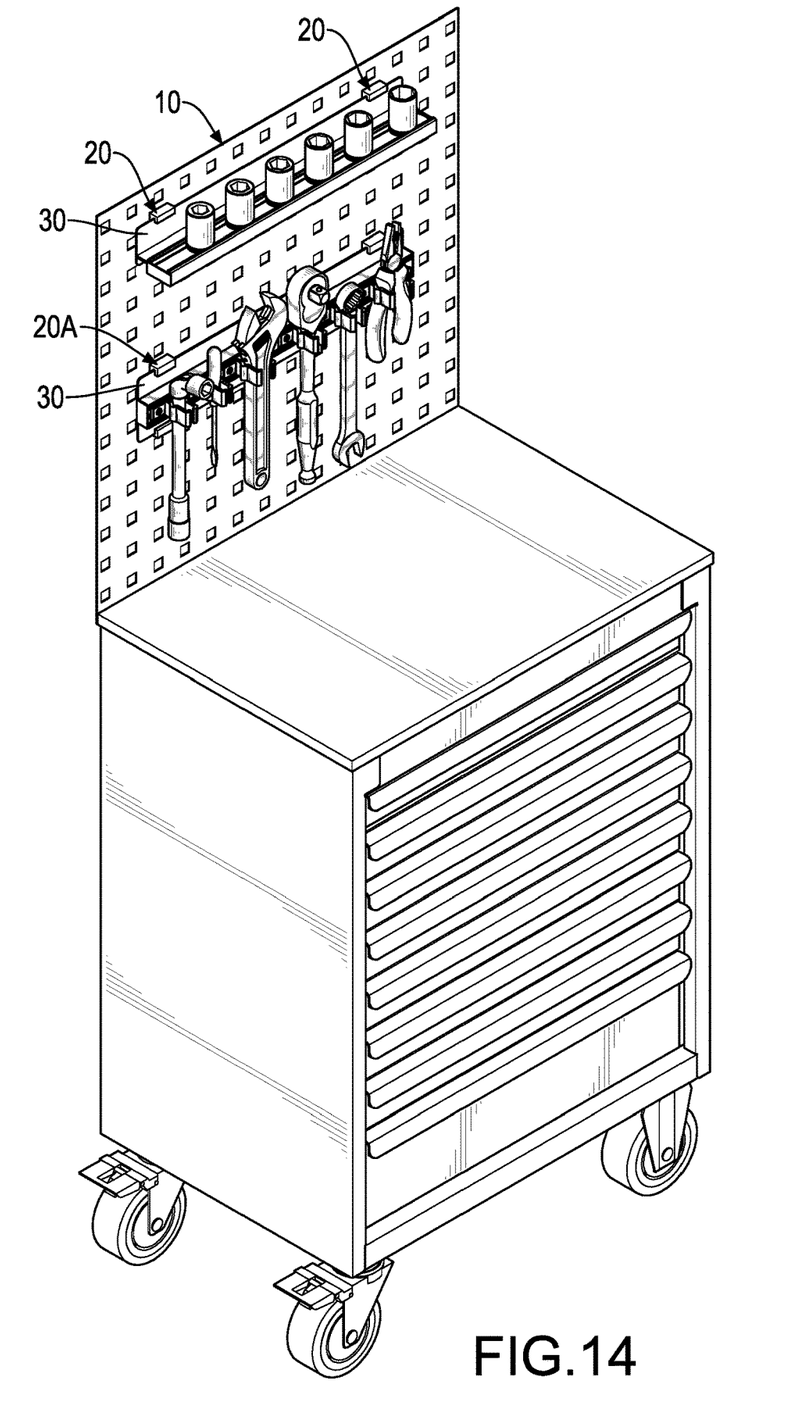
FIG. 14 is another operational perspective view of the suspending board in FIGS. 1 and 5.

With reference to FIG. 13, multiple kinds of hanging hooks 20,20A can be disposed on the board body 10 to hold different kinds of tool holding racks. With reference to FIG. 14, the board body 10 can be disposed on a cabinet or attached to a wall, such that the suspending board in accordance with the present invention is versatile in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A tool holding rack comprising:
  a back board; and
  a pair of hanging hooks attached to the back board, and each hanging hook comprising
    a hook body;
    at least one through hole defined through the hook body, one of the at least one through hole formed in the hook body of the hanging hook and being circular in shape; and
    a track channel defined in the hook body, wherein the back board extends through the track channels in the pair of hanging hooks;
  wherein each hanging hook has a fixing block with a non-circular cross section formed on a side of the hook body of the hanging hook opposite the back board.

2. A suspending board comprising:
  a board body having multiple holding holes defined in the board body;
  at least one pair of hanging hooks mounted on the board body, the hanging hooks of each one of the at least one pair of hanging hooks spaced from each other, and each hanging hook comprising
    a hook body;
    one through hole defined through and formed in the hook body of the hanging hook and being circular in shape;
    a track channel defined in the hook body; and
    at least one fastening member mounted respectively through the through hole and connected respectively with at least one of the holding holes in the board body to hold the hanging hook securely on the board body; and
  a tool holding rack having a back board extending through the track channels in the hanging hooks of one of the at least one pair of hanging hooks; wherein
  each hanging hook has a fixing block with a non-circular cross section formed on a side of the hook body of the hanging hook opposite the back board of the tool holding rack.

3. The suspending board as claimed in claim 2, wherein the holding holes in the board body are noncircular in shape.

4. The suspending board as claimed in claim 3, wherein the hook body of each hanging hook is elongated and has two hook protrusions formed on a side and respectively at two ends of the hook body; and
  each hook protrusion on the hook body of each hanging hook has an engaging recess defined in a side of the hook protrusion facing the other hook protrusion on the hook body to form the track channel by the engaging recesses in the hook protrusions.

5. The suspending board as claimed in claim 4, wherein each one of the at least one fastening member of each hanging hook comprises
  a bolt extending through the through hole in the hook body of the hanging hook; and
  a nut screwed with the bolt.

6. The suspending board as claimed in claim 2, wherein the hook body of each hanging hook is elongated and has two hook protrusions formed on a side and respectively at two ends of the hook body; and
  each hook protrusion on the hook body of each hanging hook has an engaging recess defined in a side of the hook protrusion facing the other hook protrusion on the hook body to form the track channel by the engaging recesses in the hook protrusions.

7. The suspending board as claimed in claim 6, wherein each one of the at least one fastening member of each hanging hook comprises
  a bolt extending through the through hole in the hook body of the hanging hook; and
  a nut screwed with the bolt.

\* \* \* \* \*